United States Patent
Shyu et al.

(10) Patent No.: US 7,312,933 B2
(45) Date of Patent: Dec. 25, 2007

(54) RECTANGULAR MONOBLOC OPTICAL LENS AND MANUFACTURING METHOD THEREOF

(75) Inventors: San-Woei Shyu, Taipei (TW); Chien-Min Wu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 11/403,894

(22) Filed: Apr. 14, 2006

(65) Prior Publication Data
US 2007/0171535 A1 Jul. 26, 2007

(30) Foreign Application Priority Data
Jan. 18, 2006 (TW) .............................. 95101830 A

(51) Int. Cl.
*G02B 17/00* (2006.01)

(52) U.S. Cl. ...................................... 359/728; 359/726

(58) Field of Classification Search ........ 359/726–728, 359/718, 719
See application file for complete search history.

(56) References Cited

U.S. PATENT DOCUMENTS

| 1,898,791 A * | 2/1933 | Schlumbohm | 359/636 |
| 2,561,895 A * | 7/1951 | Walder | 359/718 |
| 6,356,398 B1 * | 3/2002 | Otsuki et al. | 359/739 |

* cited by examiner

Primary Examiner—Scott J. Sugarman
Assistant Examiner—Darryl J. Collins
(74) Attorney, Agent, or Firm—Troxell Law Office, PLLC

(57) ABSTRACT

A rectangular monobloc optical lens and a manufacturing method thereof are disclosed. A monobloc optical lens includes a rectangular surround and a central mirror-surface area. The rectangular surround is mounted inside a clipping part of a lens holder. The central mirror-surface area consists of a convex aspherical surface and a concave aspherical surface while the convex aspherical surface faces an image side and the concave aspherical surface faces an object side. The manufacturing method includes the steps of: cutting a sheet made from glass material into a plurality of rectangular sheet units; then setting the rectangular sheet unit into a mold for lens for hot pressing. Thereby, the manufacturing process is simplified and the cost is reduced. Moreover, the lens has high resolution and the volume of the lens is effectively reduced so as to increase the applications of the lens.

9 Claims, 6 Drawing Sheets

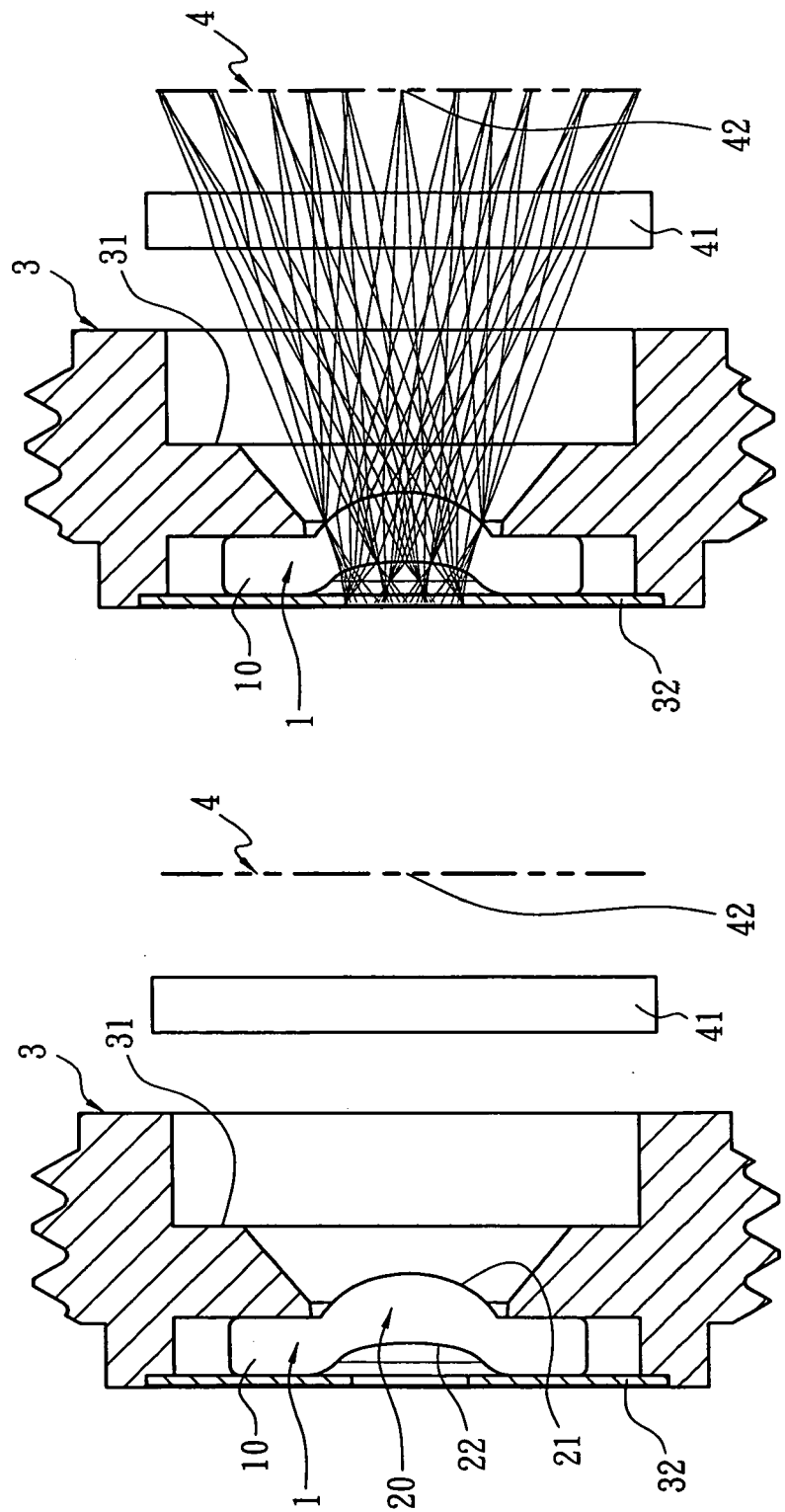

RECTANGULAR MONOBLOC OPTICAL LENS AND MANUFACTURING METHOD THEREOF

BACKGROUND OF THE INVENTION

The present invention relates to a rectangular monobloc optical lens and a manufacturing method thereof, especially to a monobloc glass lens having a concave and a convex aspherical surfaces with features of high performance and lower cost and a manufacturing method thereof. The lens is applied to mobile phones with cameras, or other cameras with image sensors such as Charge-Charged Device (CCD), or Complementary Metal-Oxide. Semiconductor (CMOS).

Due to fast progress of modern technology, electronics are getting more compact, light-weigh, and having multiple functions. While a lot of electronics such as digital cameras, PC cameras, network cameras, mobile phones or personal digital assistance are mounted with an image taking device. For easy carrying and requirements of users, the image taking device not only has good image quality, but also has compact size as well as low cost so that it can be used widely.

There are various materials for producing spherical lens. The glass lens is better for correcting chromatic aberration so that it is adapted widely. However, it's difficult to correct Aberrations such as aplanatism or astigmatism for the glass spherical lens with smaller F Number and wide angle. In order to improve such disadvantages, aspherical plastic lens or aspherical glass lens are applied on image taking devices for better image quality. Please refer to U.S. Pat. No. 6,031,670, Japanese Patent Application No. P2001-183578A, or Taiwanese Patent Application No. 573740. Yet the lens length of the optical lens disclosed above is still too long. For example, the lens disclosed in Japanese Patent Application No. P2001-183578A consists of two lens sets. The so-called 1g-1p lens includes a glass lens and a plastic lens while "2-g", "2-p" respectively represent two sets of glass lens and plastic lens. The distance from the first surface of the first lens to the second surface of the second lens is larger or equal to 0.9f (d≦0.9f, f is focal length of the whole lens set). Thus the volume of camera lens can't be reduced. Neither can the manufacturing cost be reduced.

Moreover, manufacturing processes of a conventional aspherical lens with biconvex aspherical surfaces includes following steps: a block of molding glass is cut into a plurality of small units. Each of the units is grinded and polished so as to form a semi-product with biconvex surfaces or a spherical semi-product. Then the semi-product is set into a mold for lens for hot pressing. It's time and labor consuming to run the grinding and polishing processes. Thus the manufacturing cost is increased and the process can't be refined. Therefore, the requirements of compact size and light weight for electronics can't be satisfied and the applications of the lens are restricted.

SUMMARY OF THE INVENTION

Therefore it is a primary object of the present invention to provide a rectangular monobloc optical lens that is made by steps of: cutting a sheet made from glass material into a plurality of rectangular sheet units. Then set the rectangular sheet unit into a mold for lens for hot pressing to form a monobloc glass lens. The rectangular monobloc optical lens includes a rectangular surround and a central mirror-surface area. The rectangular surround fits size of a clipping part of a lens holder for being mounted inside the lens holder. The central mirror-surface area consists of a convex aspherical surface and a concave aspherical surface while the convex aspherical surface faces an image side and the concave aspherical surface faces an object side. The manufacturing method includes the steps of: cutting a sheet made from glass material into a plurality of rectangular sheet units; then setting the rectangular sheet unit into a mold for lens for hot pressing. Thereby, the manufacturing process is simplified and the cost is reduced. Moreover, the lens has high resolution and the volume of the lens is effectively reduced so as to increase the applications of the lens.

It is another object of the present invention to provide a rectangular monobloc optical lens whose central mirror-surface area includes a convex aspherical surface and a concave aspherical surface. The lens not only has high resolution but also has minimized volume. For example, the focal length is 1.87 mm or even less while the total length—distance from front surface of the lens to the sensing surface is 2.87 mm or even less. And diagonal line of the sensing surface of the CMOS image sensor equals or less than ⅓"

It is a further object of the present invention to provide a method for manufacturing a rectangular monobloc optical lens comprising steps of: provide a glass sheet that is cut into a plurality of rectangular sheet units. Then the rectangular sheet unit is set into a mold for lens having a convex aspherical surface and a concave aspherical surface for hot pressing to produce a rectangular monobloc optical lens. Thus the manufacturing process is simplified and the cost is reduced.

BRIEF DESCRIPTION OF THE DRAWINGS

FIG. 3 is a side view of the embodiment being used in accordance with the present invention;

FIG. 4 is a schematic drawing showing light pathway of the embodiment in FIG. 3;

DETAILED DESCRIPTION OF THE PREFERRED EMBODIMENT

Figure 1:
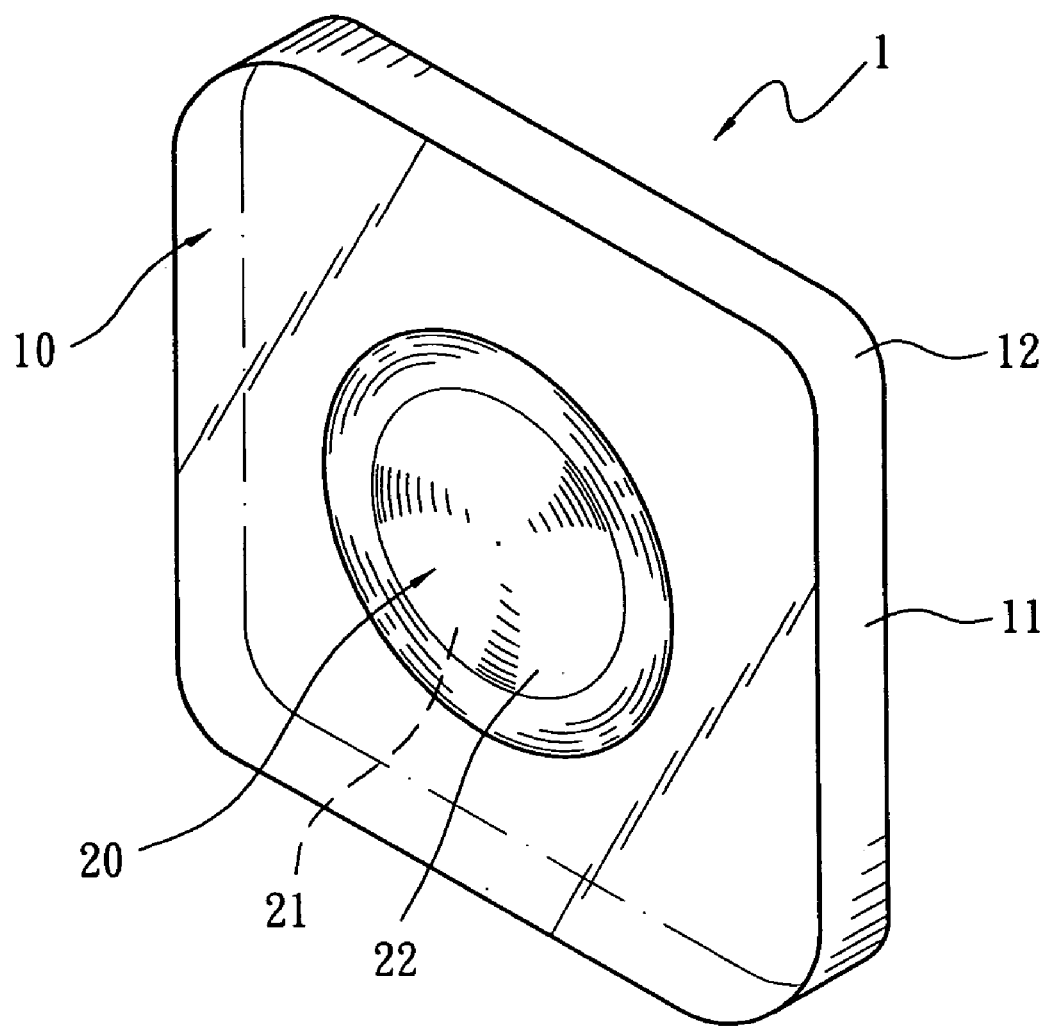
FIG. 1 is a perspective view of an optical structure of an embodiment in accordance with the present invention.
Figure 2A:
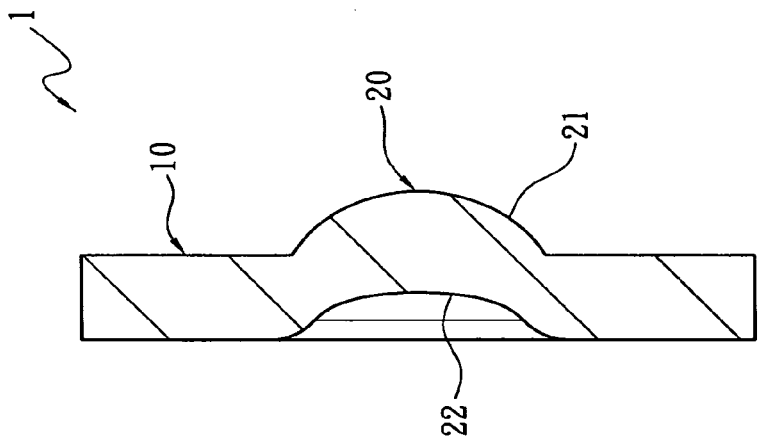
FIG. 2(A) is a side view of the embodiment in accordance with the present invention.
Figure 2B:
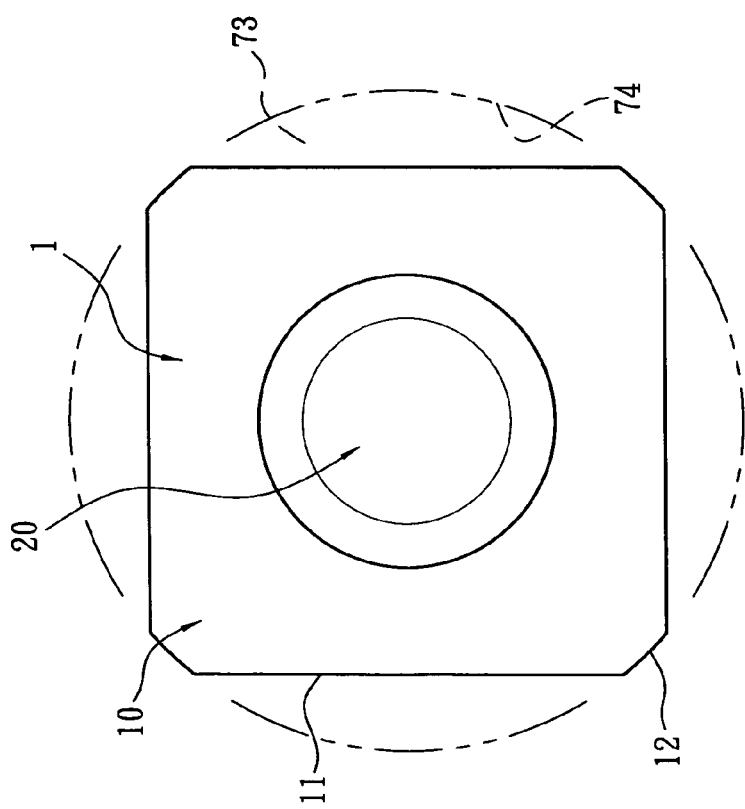
FIG. 2(B) is a front view of the embodiment in accordance with the present invention.

Refer to FIG. 1, FIG. 2(A), FIG. 2(B), & FIG. 3, an optical lens 1 in accordance with the present invention is a monobloc glass lens composed by a rectangular surround 10 and a central mirror-surface area 20. The rectangular surround 10 should match a clipping part 31 of a lens holder 3 so that the lens 1 can be mounted inside the lens holder 3. The central mirror-surface area 20 includes a convex aspherical surface 21 and a concave aspherical surface 22. The convex aspherical surface 21 faces an image side while the concave aspherical surface 22 faces side of the object. In usage, as shown in FIG. 4, light enters from an aperture 32 on front side of the lens holder 3, firstly through the concave aspherical surface 22 into the lens 1, then passing the convex aspherical surface 21 and out of the lens 1. Next the light passes a lens protector 41 and an image is formed on sensing surface 42 of the image sensors 4 such as CMOS or CCD.

Figure 5A:
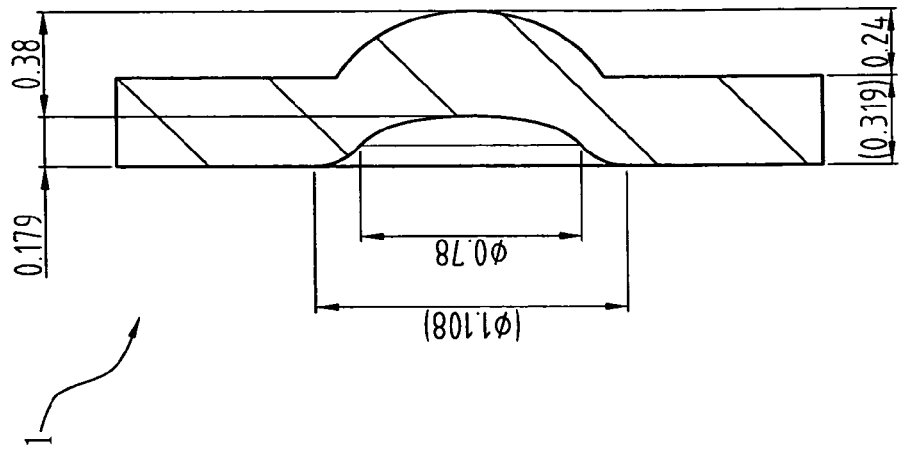
FIG. 5(A) shows reference size of the embodiment in FIG. 2(A)
Figure 5B:
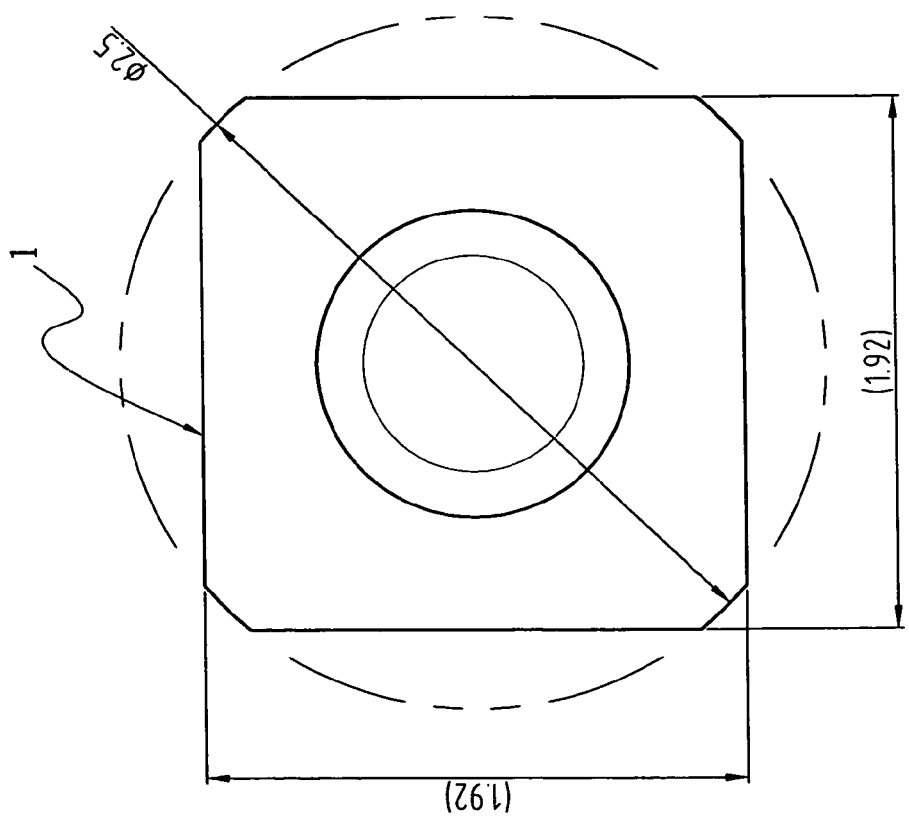
FIG. 5(B) shows reference size of the embodiment in FIG. 2(B)
Figure 6:
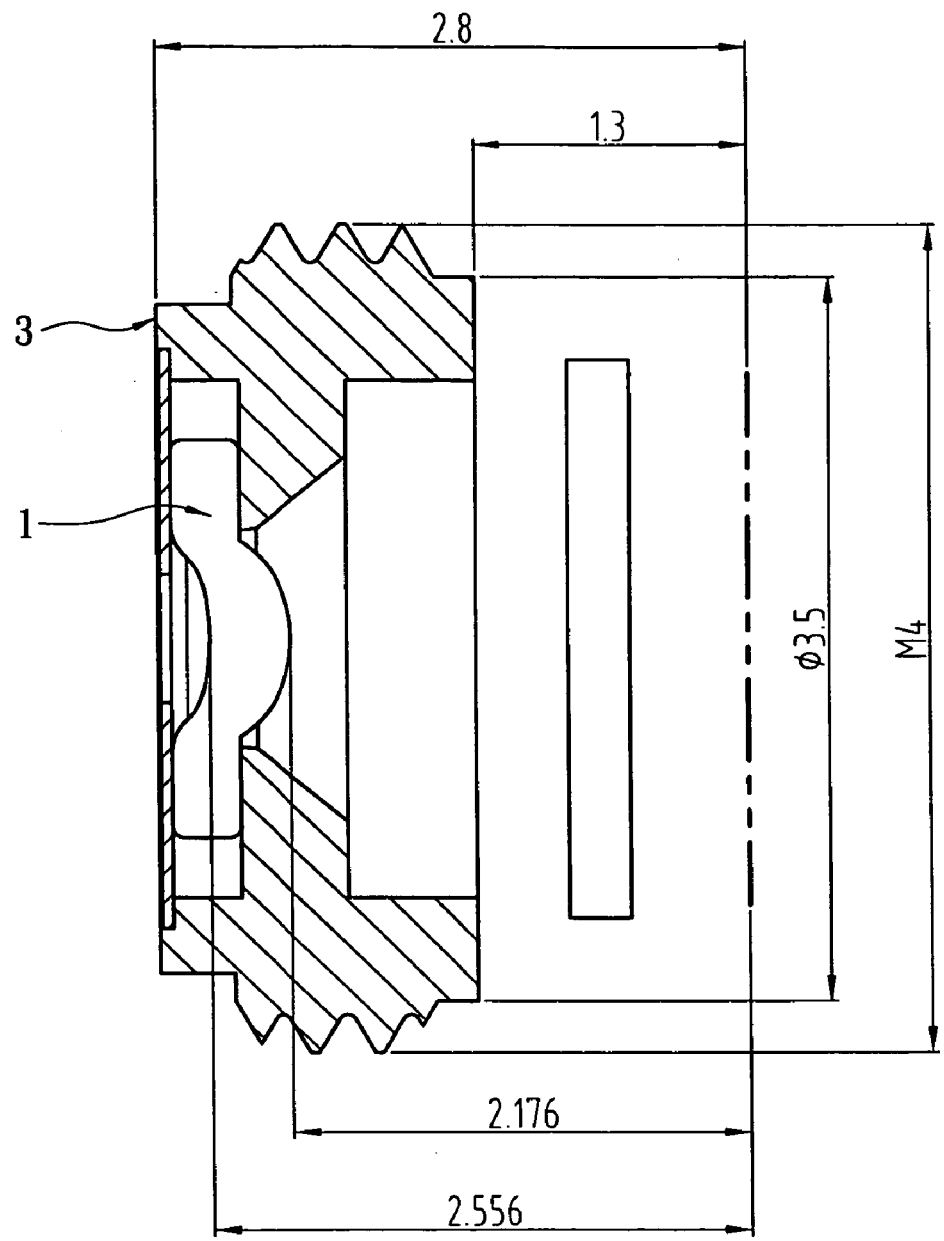
FIG. 6 shows reference size of the embodiment in FIG. 3.

Due to requirements such as compact size and light weight of products, the optical lens also develop toward trends of high-quality, low cost, short length, small size, and lightweight. The manufacturing processes of the optical lens 1 according to the present invention are quite specific so that the formed lens has special structure for matching above requirements. Refer from FIG. 5(A), FIG. 5(B) & FIG. 6, the focal length of the lens 1 is about 1.87 mm or less while the total length—distance from the aperture 32 in front of the lens holder 3 to the sensing surface 42 is 2.87 mm or even less. And diagonal line of the sensing surface 42 of the CMOS image sensor 4 being used equals or less than 1/7". As to the convex aspherical surface 21 and concave aspherical surface 22 of the mirror-surface area 20 in accordance with the present invention, the related parameters are as followings:

| Concave aspherical surface 22 | |
|---|---|
| R = −1.131684 | K = 2.199666 |
| | A4 = 2.4218476 |
| | A6 = −51.453692 |
| | A8 = 327.77628 |
| | A10 = −990.56954 |
| | A12 = 0 |
| | A14 = 0 |

| convex aspherical surface 21 | |
|---|---|
| R = −0.5835097 | K = −14.1246 |
| | A4 = −5.1269103 |
| | A6 = 32.985477 |
| | A8 = −193.86029 |
| | A10 = 574.86653 |
| | A12 = −763.00562 |
| | A14 = 0 |

Figure 7:
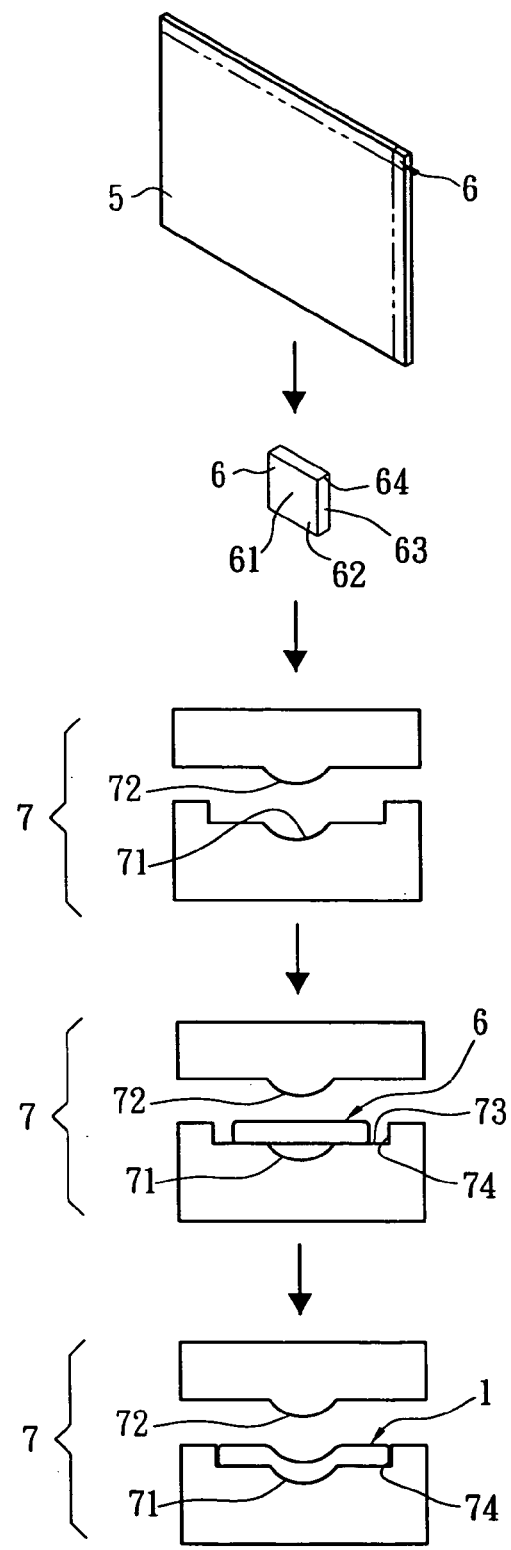
FIG. 7 is a schematic drawing of the manufacturing processes in accordance with the present invention.

Aspherical Surface Equation $$X = \frac{CY^2}{1+\sqrt{1-(K+1)C^2Y^2}} + A_2Y^2 + A_4Y^4 + A_6Y^6 + A_8Y^8 + A_{10}Y^{10} + A_{12}Y^{12} + A_{14}Y^{14} + A_{16}Y^{16}$$

where C=1/R;

X (Sag value) is the length (in mm) of a line drawn from a point on the aspheric lens surface at a distance Y from the optical axis to the tangential plane of the aspheric surface vertex, Y is the distance (in mm) from the optical axis C is the curvature; the inverse of the radius of curvature at the vertex K: the Conic constant;

$A_2$-$A_n$: respectively is an aspheric coefficient, with the summation extending over n, Refer to FIG. 7, the manufacturing processes of the present invention includes following steps:

Step 1: providing a laminated glass material 5 with homogeneous thickness;

Step 2: cutting the laminated glass material 5 into a plurality of rectangular sheet units 6 while each of the rectangular sheet units 6 got the homogeneous thickness of the glass material 5;

Step 3: providing a mold 7 for lens and two corresponding aspherical mold surfaces—an aspherical concave mold surface 71 and an aspherical convex mold surface 72 are disposed on central part of the upper and lower molds; a mold cavity 73 is arranged on circumference of the aspherical concave mold surface 71 and the aspherical convex mold surface 72;

Step 4: set the rectangular sheet unit 6 into the center of the mold 7 for high-temperature hot pressing operating so as to make a central area 61 of the rectangular sheet unit 6 be extruded into the convex aspherical surface 21 and the concave aspherical surface 22 of the mirror-surface area 20 by the aspherical concave mold surface 71 and the aspherical convex mold surface 72 of the mold 7. Moreover, the periphery 62 of the rectangular sheet unit 6 is pressed inside the mold cavity and is extended outward so as to form the rectangular surround 10 of the lens 1. Furthermore, the temperature for (hot pressing) ranges from about 500 Celsius degrees to 700 Celsius degrees, depending on the characters of the glass material 5.

Step 5: releasing the molded lens 1 form the mold 7.

In Step 1, instead of conventional glass block, the glass material 5 is a thin glass plate with large area and homogeneous thickness. In an embodiment of the present invention, the thickness of the glass material 5 is 0.40 mm.

In Step 2, the rectangular sheet unit 6 is a small-sized glass lamina with certain circumference and thickness and is able to be set inside the mold 7 for hot pressing. Compared with conventional glass blocks, there is no need to run the surface-grinding and polishing processes. Since the time-consuming processes of grinding and polishing are avoided, the manufacturing cost is effectively reduced. In an embodiment of the present invention, the thickness of the rectangular sheet unit 6 is equal to that of the glass material 5 while the side length 63 thereof is 1.70 mm. This is a bit smaller than the side length 11 of the rectangular surround 10 of the lens 1. The difference between them is a distance for extension of the rectangular sheet unit 6 while being pressed inside the mold 7.

In Step 3, the aspherical concave mold surface 71 and the aspherical convex mold surface 72 that corresponds to each other are respectively on central part of the upper and lower molds of the mold 7 so as to extrude the convex aspherical surface 21 and concave aspherical surface 22 of the mirror-surface area 20 of the lens 1. The mold cavity 73 is disposed on circumference of the aspherical concave mold surface 71 or the aspherical convex mold surface 72, corresponding to the rectangular surround 10 of the lens 1. In a preferred embodiment of the present invention, the mold cavity 73 can be a round slot with diameter of 2.5 mm and depth of 0.319 mm, corresponding to the thickness of the rectangular surround 10 of the lens 1.

In Step 4, under operation of hot pressing, the central area 61 of the rectangular sheet unit 6 is stamped to form the convex aspherical surface 21 and the concave aspherical surface 22 of the lens 1 so as to compose the convex-concave central mirror-surface area 20. Meanwhile, the rectangular sheet unit 6 is pressed inside the mold 7 so that the periphery 62 thereof extends outward to form the rectangular surround 10 of the lens 1 while the four corners 64 of the rectangular sheet unit 6 are pressed and extended against a circular surface 74 of the circular(round) mold cavity 73 to form round corners 12 of the lens 1. Furthermore, the temperature for hot pressing ranges from about 500 Celsius degrees to 700 Celsius degrees, depending on the characters of the glass material 5.

In Step 5, the molded lens 1 is cooled down to 100 Celsius degrees in the mold 7 and then is released from the mold 7. After the temperature down to the room-temperature, the manufacturing processes of the lens 1 are finished.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rectangular monobloc optical lens made from a rectangular sheet unit that is formed by cutting of a glass plate and then being hot pressed into a monobloc glass lens comprising a rectangular surround and a central mirror-surface area; wherein the rectangular surround that fits size of a clipping part of a lens holder for being mounted inside the lens holder;

the central mirror-surface area having a convex aspherical surface and a concave aspherical surface while the convex aspherical surface faces an image side and the concave aspherical surface faces an object side.

2. The device as claimed in claim 1, wherein the convex aspherical surface faces a sensing surface of an image sensor.

3. The device as claimed in claim 1, wherein the image sensor is a Complementary Metal-Oxide Semiconductor (CMOS) or Charge-Charged Device (CCD).

4. The device as claimed in claim 2, wherein the image sensor is a Complementary Metal-Oxide Semiconductor (CMOS) or Charge-Charged Device (CCD).

5. The device as claimed in claim 1, wherein focal length of the glass lens is no more than 1.87 mm.

6. The device as claimed in claim 1, wherein total length of the glass lens ranging from front surface of the lens to the sensing surface is 2.87 mm or even less.

7. The device as claimed in claim 2, wherein total length of the glass lens ranging from front surface of the lens to the sensing surface is 2.87 mm or even less.

8. The device as claimed in claim 1, wherein diagonal line of the sensing surface of the image sensor is equal to or less than 1/7".

9. The device as claimed in claim 2, wherein diagonal line of the sensing surface of the image sensor is equal to or less than 1/7".

* * * * *